UNITED STATES PATENT OFFICE.

ARMENAK HAROUTUNE SUZMEYAN AND PERCY ARAM ARMENAK SUZMEYAN, OF FALLOWFIELD, MANCHESTER, ENGLAND.

PROCESS FOR PRODUCING OIL AND CELLULOSIC MATERIAL FROM NUTS.

1,185,262.     Specification of Letters Patent.     Patented May 30, 1916.

No Drawing.     Application filed May 20, 1915. Serial No. 29,314.

*To all whom it may concern:*

Be it known that we, ARMENAK HAROUTUNE SUZMEYAN, manager, and PERCY ARAM ARMENAK SUZMEYAN, assistant manager, subjects of the Sultan of Turkey, residing at "Claremont," Brook Road, Fallowfield, Manchester, county of Lancaster, England, have invented new and useful Improvements in Processes for Producing Oil and Cellulosic Material from Nuts, of which the following is a specification.

Our invention relates to a method or process for extracting and recovering oils or fats from nuts and their shells and for obtaining a residue of cellulosic material in suitable condition for conversion into glucose.

We take cocoa-nuts, cohoune nuts, coquito nuts, coyol nuts, corozo nuts, or nuts of similar kind, many of such having a shell of very considerable thickness. The nuts chiefly used have a shell and sometimes fiber of from 80 to 90 per cent. of the whole so that the kernel is a comparatively small portion of such nuts. We take such nuts, shell, fiber, kernel altogether, as gathered, or separately, and we grind the same. This can be done in a disintegrator or suitable grinding machine. The grinding treatment is continued until granules or a ground-up mass is obtained—as for example we may grind until a mass resembling coarsely ground sugar results. This ground mass we treat in pans or suitable extraction plant to the action of benzin or like spirit, adding benzin in suitable amount in the extraction plant. For example we add 1 to 7 per cent. of benzin. The mass is subjected to heat. This treatment with benzin may extend over a period of from 2 to 6 hours, the oil extracted by treatment with benzin or like spirit being run off. In this manner the oils from the entire ground nuts, or from the shells, fiber and kernels separately, is obtained, and such oil may be submitted to any desired further treatment. The residue of shell or fiber and kernel (mostly ground shell) is then treated in a pan or other receptacle with mineral acid as for example sulfuric acid and water and is boiled by steam heat or otherwise. We use from 1 to 7 per cent. of acid and a sufficiency of water and we boil from 2 to 6 hours as found necessary. Following this treatment, the boiled liquid is run off or otherwise separated and is properly filtered in suitable manner. Thereafter, the liquid is neutralized, as for example by addition of lime or other neutralizing agent and is filtered. The liquid is then de-colorized by boiling with animal charcoal, fullers' earth, or such like, and is again filtered; or both neutralizing, de-colorizing and other treatment may be in one process. Both the neutralizing and de-colorizing treatment may conveniently extend over a period of from 2 to 6 hours. The clear syrupy liquid obtained after the boiling is finally further boiled or evaporated to produce glucose liquor, which we may market, or we may treat such liquid to obtain crystals.

The amount of the re-agents used and the length of time the masses or liquors are subjected to treatment and heat depends largely on the character of the nuts and varies according to the thickness and hardness of the shells and fibers.

By our invention we can economically extract oil from nuts including the shells and fibers (or in case such are marketed from shells and fibers alone) without expensive breaking treatment, by an initial grinding treatment taking the place of breaking treatment, and we get as a residue a product which we further treat to obtain glucose.

We declare that what we claim is:—

1. The herein-described process for obtaining oil from cohoune nuts, coquito nuts, coyol nuts, corozo nuts, and nuts of similar kind and producing a residue of cellulosic material in suitable condition for conversion into glucose, consisting in initially reducing the nuts, each in its entirety, fiber, shell and kernel, to a mass of comminuted particles, and then extracting the oil from this mass.

2. The herein-described process for obtaining oil from cohoune nuts, coquito nuts, coyol nuts, corozo nuts, and nuts of similar kind and producing a residue of cellulosic material in suitable condition for conversion into glucose, consisting in initially reducing the nuts, each in its entirety, fiber, shell and kernel, to a mass of comminuted particles, and then extracting the oil from this mass by the use of a spirit and heat.

3. The herein-described process for obtaining oil from cohoune nuts, coquito nuts, coyol nuts, corozo nuts, and nuts of similar kind and producing a residue of cellulosic material in suitable condition for conversion into glucose, consisting in initially grinding the nuts, each in its entirety, fiber, shell and kernel, to produce a mealy mass, and then extracting the oil from this mass.

In testimony whereof we have signed our names to this specification in the presence of two subscribing witnesses.

ARMENAK HAROUTUNE SUZMEYAN.
PERCY ARAM ARMENAK SUZMEYAN.

Witnesses.
ARTHUR GORDON HEALD,
ALFRED STUART YATES.